(12) United States Patent
Parker

(10) Patent No.: US 12,545,750 B2
(45) Date of Patent: Feb. 10, 2026

(54) METHOD FOR THE DIIMIDE HYDROGENATION OF EMULSIFIED UNSATURATED POLYMERS

(71) Applicant: Dane K. Parker, Coshocton, OH (US)

(72) Inventor: Dane K. Parker, Coshocton, OH (US)

( * ) Notice: Subject to any disclaimer, the term of this patent is extended or adjusted under 35 U.S.C. 154(b) by 108 days.

(21) Appl. No.: 18/488,370

(22) Filed: Oct. 17, 2023

(65) Prior Publication Data

US 2024/0084046 A1 Mar. 14, 2024

Related U.S. Application Data

(62) Division of application No. 17/385,470, filed on Jul. 26, 2021, now Pat. No. 11,827,723.

(60) Provisional application No. 63/056,915, filed on Jul. 27, 2020.

(51) Int. Cl.
C08C 19/02 (2006.01)
C08C 19/26 (2006.01)

(52) U.S. Cl.
CPC .............. *C08C 19/02* (2013.01); *C08C 19/26* (2013.01)

(58) Field of Classification Search
CPC .. C08K 3/28; C08K 5/24; C08C 19/02; C01B 21/16
See application file for complete search history.

(56) References Cited

U.S. PATENT DOCUMENTS

| 4,452,950 | A | * | 6/1984 | Wideman | C08C 19/02 |
| | | | | | 525/333.1 |
| 5,039,737 | A | | 8/1991 | Parker et al. | |
| 5,057,601 | A | | 10/1991 | Schiessl et al. | |
| 5,424,356 | A | * | 6/1995 | Parker | B61C 11/06 |
| | | | | | 525/329.2 |
| 5,442,007 | A | | 8/1995 | Parker et al. | |
| 5,442,009 | A | | 8/1995 | Parker et al. | |
| 6,521,694 | B2 | * | 2/2003 | Belt | C08F 8/04 |
| | | | | | 525/337 |
| 6,552,132 | B2 | | 4/2003 | Belt et al. | |
| 7,767,752 | B2 | | 8/2010 | Kim et al. | |
| 2015/0119530 | A1 | * | 4/2015 | Liu | C08F 236/12 |
| | | | | | 525/329.3 |

* cited by examiner

*Primary Examiner* — Robert C Boyle
(74) *Attorney, Agent, or Firm* — Alvin T. Rockhill

(57) ABSTRACT

The diimide hydrogenation of unsaturated elastomers in latex utilizing hydrazine and hydrogen peroxide or oxygen, is a metal-catalyzed process. Copper ion has been found to be the most superior catalyst for this reaction, requiring an extremely low concentration for optimal results. Generated diimide efficiently hydrogenates the polymer olefinic unsaturation while generating water and nitrogen as byproducts. With a falling hydrazine concentration during the hydrogenation process however, a competing copper-catalyzed process capable of generating hydroxyl, superoxide and/or copper-oxyl radicals becomes increasingly competitive. The ability of these radical species to abstract hydrogen from the polymer backbone to generate polymeric radicals, ultimately results in crosslinking that occurs concurrently with hydrogenation. The concept of an OH radical inactivating ligand (OIL) complexed with copper is demonstrated to ameliorate the crosslinking reaction.

17 Claims, 2 Drawing Sheets

Catalyzed Formation of Diimide by Copper-Oxygen Complexes Using Oxygen

Catalyzed Formation of Diimide by Copper-Oxygen Complexes Using Hydrogen Peroxide

METHOD FOR THE DIIMIDE HYDROGENATION OF EMULSIFIED UNSATURATED POLYMERS

This application is a divisional of U.S. patent application Ser. No. 17/385,470, filed on Jul. 26, 2021, which claims the benefit of U.S. Provisional Patent Application Ser. No. 63/056,915 filed on Jul. 27, 2020. The teachings of U.S. patent application Ser. No. 17/385,470 and U.S. Provisional Patent Application Ser. No. 63/056,915 are incorporated herein by reference in their entirety.

FIELD OF THE INVENTION

The present invention relates to a new method for hydrogenating lattices of unsaturated polymers without causing significant levels of crosslinking. This method is particularly useful in hydrogenating functionalized unsaturated rubbers, such as nitrile rubber (NBR) and carboxylated nitrile rubber (XNBR).

BACKGROUND OF THE INVENTION

Hydrogenated polymers, such as hydrogenated rubbers, offer improved thermal and oxidative stability as compared to their unsaturated counterparts. Additionally, hydrogenation can be used to adjust the crystallinity and glass transition temperatures of such polymers as may be desired. Functionalized hydrogenated elastomers offer the further advantage of higher mechanical strength and higher levels of adhesion to a variety of substrates.

Research into the chemical modification of unsaturated polymers, especially diene elastomers, has emerged as an area of immense technological importance. Perhaps the first general technique for modification of unsaturated elastomers after the discovery of vulcanization was catalytic hydrogenation. Hydrogenation of these polymers in solvent solution by homogeneous or heterogeneous activation of molecular hydrogen with various transition metals has evolved into a commercially significant process. As previously noted, hydrogenation not only improves polymer thermal and oxidative stability, but also can affect polymer crystallinity and glass transition temperature. Unfortunately, conventional hydrogenation technology also comes with many potential hazards and costs. Hydrogen is a flammable gas and forms an explosive mixture with air over a wide range of concentrations. Solvent vapors and highly active catalyst residues compound the danger of explosion. Catalyst removal from the products, especially for homogeneous catalyst types, is often difficult, requiring extensive post-hydrogenation recovery techniques. For costly noble metal catalyst systems, removal, recovery and reuse are usually prerequisites for an economically viable process. Other areas of serious concern are solvent recycling and catalyst poisoning. With hydrocarbon-based rubbers, such as styrene-butadiene rubber (SBR), styrene/butadiene/styrene triblock polymers (SBS), or polybutadiene rubbers (PBd) virtually any hydrogenation catalyst is suitable. However, the choice of useful catalysts is limited in the case of polymers that include one or more functional groups, such as nitrile groups, carbonyl groups, carboxyl groups, amino groups, sulfide groups, or halogens. Additionally, the physical form of hydrogenated polymers is normally important in the method used in manufacturing desired products. More specifically, most hydrogenated polymers produced today are generally available only in a solid form, such as bales, pellets, or sheets, and are typically not available in the form of a latex. This accordingly can preclude their utilization in manufacturing methods where a latex is required.

In 1929 Hanus and Vorisek were perhaps the first to realize that hydrazine could serve as a hydrogenating reagent for unsaturated carbon-carbon bonds (see J Hanus and J Vorisek, Coll. Czech. Chem. Comm., 1, 223 (1929). Later, it became evident that hydrazine alone was not the active species in the reduction and that an oxidizing coagent was also required. Among the oxidizing agents most frequently used was air (oxygen), hydrogen peroxide or sulfur. Furthermore, it was recognized by Corey et. al., that even with a powerful oxidizing agent like hydrogen peroxide, the reaction was very slow if heavy metal ions (especially copper) were rigorously excluded (see E J Corey, W L Mock and D J Pasto, Tet. Lett., #11, 347 (1961). Corey also noted that a substantial excess hydrazine was required for efficient hydrogenation of olefins in solution; clearly indicating that the reactive intermediate (diimide) was being diverted by a competing process, most likely self-destruction.

Reduction:

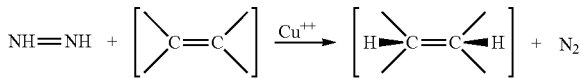

Diimide Self-Destruction:

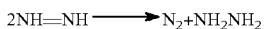

Diimide (HN=NH), is a highly reactive ephemeral species with a lifetime estimated to be at most only a few seconds. Although never isolated, its existence has been proven by mass spectroscopy and by its reactions. In general, carbon-carbon triple bonds and symmetrical double bonds such as C=C and N=N are most easily reduced. As alkyl substitution on the double bond increases, the relative reactivity decreases. Conjugated dienes are more reactive than monoenes, and strained double bonds more reactive than unstrained double bonds. Most importantly, diimide reductions can be carried out in the presence of a number of reactive functional groups (N—O, O—O, S—S, halogen etc.) that would be destroyed by conventional catalytic hydrogenation. Even with these desirable attributes, the high cost and inefficiency of diimide reductions in solution has relegated this technique to special situations of mainly academic or analytical interest.

After the issuance of U.S. Pat. No. 4,452,950 in 1984 the level of academic and commercial interest in diimide hydrogenation increased dramatically. This patent describes a diimide reduction which is carried out on unsaturated rubbers in emulsion (latex) form. This technology was developed by Lawson G. Wideman at The Goodyear Tire & Rubber Company and involves a diimide reduction process which comprises reacting an ethylenically unsaturated polymer in latex form with a reducing agent, an oxidant, and a metal catalyst.

Emulsions by virtue of their large interfacial surface area demonstrate enhanced transport and increased rates of chemical reaction, ideal for micellar catalysis. In essence, each particle (ca. $1 \times 10^{17}$/liter in a typical latex) operates like a nano-reactor. Each "reactor" has the same initial ratio of double bonds, oxidant, hydrazine and copper ion catalyst available to it (see D. K. Parker, The Polymeric Materials Encyclopedia, CRC Press, Inc., vol. 3, 2048 (1996). However, the importance played by the carboxylate soap in the reduction process was not immediately recognized. In any case, essentially all commercial emulsion rubber latexes use these "surfactants" as an integral part of the emulsion polymerization process employed in their synthesis. The importance of carboxylate surfactant was clearly demonstrated by attempting the diimide reduction of a nitrile rubber (NBR) latex prepared using only a nonionic surfactant. In this case, only a 15% olefin hydrogenation was achieved. With the addition of sodium stearate to the nonionic latex, a 43% olefin hydrogenation was accomplished under the same reaction conditions (see D. K. Parker, R. F. Roberts and H. W. Schiessl, Rubber Chem. & Technol., 65, 245 (1992). The dramatic difference in activity can best be explained by changes in the structure and location of the copper ion catalyst in the latex medium. It is well known that cupric salts will react with carboxylate surfactants to yield a dicopper carboxylate by the following reaction (see P. Maldivi, L. Bonnet, A-M Giroud-Godquin, M. Ibn-Elhaj, D. Guillon, and A. Skoulios, Adv. Mater., 5, 909 (1993).

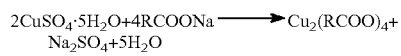

$$2CuSO_4 \cdot 5H_2O + 4RCOONa \longrightarrow Cu_2(RCOO)_4 + Na_2SO_4 + 5H_2O$$

In the rubber latex, dicopper carboxylate resides at the latex particle/bulk water interface. It is noteworthy, that this description of catalyst precursor structure and physical location (within a membrane) bears a strong resemblance to the situation observed in many bi-metallic, bridged enzymes e.g. tyrosinase, ribonucleotide reductase, methane monooxygenase etc. In fact, the catalytic activity of the "active" copper species in the diimide reduction process is so high, it warrants being considered a "artificial enzyme".

$$N_2H_4 + H_2O_2 + R^1HC = CHR^2 \rightarrow N_2 + R^1H_2C-CH_2R^2 + 2H_2O$$

The stoichiometry of the overall diimide/olefin hydrogenation reaction in emulsion looks deceptively simple with non-polluting nitrogen and water being produced as byproducts. This simplicity however, belies the underlying complexity of the metal ion catalyst, its interaction with oxygen and/or hydrogen peroxide, its concentration and location within the surfactant membrane of the latex particles. Other important physical and chemical variables of the system are latex particle size, surface density of metal ions per latex particle and the ligand field surrounding the metal ions (copper ions specifically). Control of this latter variable appears to be especially important in controlling the in-situ crosslinking side reaction that generally occurs concurrently during the latter stages of hydrogenation. This crosslinking side reaction has plagued this process since its discovery in 1984 and limited its current commercial use to latex applications (see Zeon Chemicals, Sealing Technology, 2008 (5) pg. 2).

The economic importance of solving this decades old problem cannot be overestimated. A 2005 PhD dissertation goes into great engineering detail to compare the economics of HNBR rubber production via the commercial solution hydrogenation method versus the latex diimide method (see Lin X., Hydrogenation of Unsaturated Polymers in Latex Form, PhD Dissertation, University of Waterloo, Ontario, Canada, 2005). The conclusion drawn was, if not for the in-situ crosslinking (gelation) problem, equivalent hydrogenated nitrile rubber (HNBR) could be prepared at only 55% the cost of the solution method. Calculations were based on 30% hydrogen peroxide as the oxidant. With oxygen (air) the cost would be only 46% of the solution process assuming similar throughput and reaction time. This potential cost advantage for the diimide method is the driving force behind the research to understand and eliminate the crosslinking side reaction. The global HNBR market was valued at $11 billion in 2018 and is projected to reach $16 billion by 2023 (see Hydrogenated Nitrile Butadiene Rubber Market 2019 Global Industry Size, Share, Forecasts Analysis, Company; Profiles, Competitive Landscape and Key Regions 2023, available at Market Reports World 2019, May 27 ([Press Release]—as retrieved from MarketWatch.com). However, the high cost of HNBR has limited its use in numerous applications and is a restraining factor that continues to restrict its market growth.

From the seminal work of Wideman on the emulsion hydrogenation process it has long been clear that oxygen (air) at ambient atmospheric pressure can be an effective oxidant of hydrazine to diimide using copper sulfate as the catalyst precursor (see in particular Examples 1-8 of U.S. Pat. No. 4,452,950). Without the addition of cupric ion, however, air oxidation of hydrazine in the presence of NBR latex proved ineffective, i.e. no reduction (see Example 35 of U.S. Pat. No. 4,452,950). Surprisingly, hydrogen peroxide addition under these same conditions did afford reduction (see Example 34 of U.S. Pat. No. 4,452,950) indicating that residual iron ions from the redox initiation system are effective with this oxidant. These observations indicate that an intermediate copper species is capable of activating oxygen and that this new copper-oxygen species can efficiently react with hydrazine to give diimide. A similar iron-oxygen species either does not form with oxygen or is inactive for the oxidation of hydrazine to diimide.

In any case, the diimide reduction process of U.S. Pat. No. 4,452,950 offers a number of advantages compared to conventional metal-catalyzed hydrogenation processes. For example, the diimide reduction can selectively hydrogenate double bonds without reducing functional groups, such as carboxyl groups, hydroxyl groups, epoxy groups, amide groups, and active halide functional groups, which makes it possible to produce different functionalized hydrogenated polymers. This process also has an advantage over metal-catalyzed hydrogenation, in that high-pressure reactors are not needed, and the desired hydrogenation reactions can be conducted at atmosphere pressure.

However, the diimide reduction process described in U.S. Pat. No. 4,452,950 has some deficiencies that excludes the use of elastomers hydrogenated using it in some applications. The most serious of these deficiencies is the result of a cross-linking reaction that occurs during the hydrogenation process. This cross-linking severely limits the number and types of applications in which hydrogenated elastomers made using the diimide reduction technique can be employed. This problem is compounded by the fact that further cross-linking occurs during subsequent coagulation steps which often renders the hydrogenated elastomer unsuitable for use in many applications. For example, high levels of crosslinking can make the hydrogenated elastomer difficult to process or completely un-processable In view of these deficiencies, a great deal of research has been conducted over the years in an attempt to develop a technique to limit gel formation in elastomers that are hydrogenated using the diimide reduction process.

Over the years a number of approaches for dealing with unwanted crosslinking have been considered. In the X. Lin PhD dissertation (2005), an entire section (Chapter 8) is devoted to previous studies of the crosslinking problem and his own work on this issue (see Lin X., Hydrogenation of Unsaturated Polymers in Latex Form, PhD Dissertation, University of Waterloo, Ontario, Canada, 2005). From the work of Q. Xie, M. Sarkar, J. Belt and G. Rempel it can be generally concluded that the crosslinking (gelation) problem observed during the diimide hydrogenation process is a radical process that is only marginally affected by the addition of conventional antioxidants (see Xie, H.-Q.; Li, X.-D.; Liu, X.-Y.; Guo, J.-S. Journal of Applied Polymer Science, v 83, n 6, Feb. 7, 2002, p 1375-1384; De Sarkar, M.; De, P. P.; Bhowmick, A. K. Polymer, v 41, n 3, November, 2000, p 907-915; De Sarkar, Mousumi; De, Prajna P.; Bhowmick, Anil K. Journal of Applied Polymer Science, v 66, n 6, Nov. 7, 1997, p 1151-1162; Belt; Johannes W.; Vermeulen; Jacobus A. A.; Kostermann; Mike, U.S. Pat. No. 6,521,694 (2003), WO 00/09576 (2000), U.S. Pat. No. 6,552,132 (2003), WO 00/09568 (2004); and X Lin, Q Pan, and G Rempel, Journal Applied Polymer Science 96: 1122-1125, 2005. This is also true when a polymerizable antioxidant, (N-4-anilinophenyl) methacrylamide, is incorporated into the unsaturated rubber by emulsion polymerization. In this latter case, there can be no doubt about the concentration and molecular distribution of the bound antioxidant in the unsaturated rubber. The polymer bound antioxidant in HSBR for instance, is extremely effective in preventing in service auto-oxidative degradation (see D. K. Parker, Rubber World, 213, 33 (1995). It should be made clear however, that conventional antioxidants should be added to the rubber latex post hydrogenation but prior to coagulation and drying to prevent typical autooxidative aging. This auto-oxidative process is separate and distinct from the crosslinking observed during the hydrogenation process.

In the Lin dissertation, a series of experiments were designed to determine the effects of what is depicted as "all" possible reactions involved in the gel forming process. In addition to the reactants involved in this system, i.e. hydrazine, hydrogen peroxide, unsaturated polymer, surfactant etc., Lin lists four possible reactions that could play a role in gel formation. These reactions are:

(1) Electron transfer during the redox reaction between hydrazine and hydrogen peroxide via radical intermediates;
(2) Radicals generated from hydrogen peroxide via the Fenton reaction;
(3) Strong oxidation capability of oxygen alone or in combination with hydrogen peroxide to form radicals; and
(4) A side reaction during hydrogenation in which diimide disproportionates through radical intermediates The initial experiments began with heating NBR latex at 40° C. for 8 hours with either hydrazine, hydrogen peroxide, boric acid or no additive at all and did not result in any gel formation. Furthermore, combinations of NBR latex with both hydrazine, hydrogen peroxide and optionally boric acid were also heated for 8 hours at a temperature of 40° C. and resulted in maximum hydrogenation conversions of 30%, but again with no gel formation. From these results it was concluded that neither oxygen, hydrogen peroxide, hydrazine or their combination (at low hydrogenation levels) is the source of the crosslinking reaction.

With the first three reactions as possible radical sources of gel being eliminated, it was postulated that the diimide disproportionation reaction within latex particles generated primary radicals that caused crosslinking. However, there is no direct evidence that this assumption is correct. To the contrary, the data provided by Schiessl in U.S. Pat. No. 5,057,601 using NBR latex containing no additional catalyst except for the iron ions in the original redox polymerization recipe, achieved a hydrogenation level of 98.6% with no gel when a large excess of hydrazine relative to olefin being used (see Example 1 of U.S. Pat. No. 5,057,601). In contrast to this, a comparative example with a much lower molar ratio of hydrazine to olefin resulted in a latex in which the polymer was heavily gelled but still was hydrogenated to 98.6%. These results would appear to argue against diimide disproportionation being a factor in gel formation. An alternative explanation for these results could be that the excess hydrazine suppresses the decomposition of the active iron catalyst intermediate but that at a lower hydrazine concentration, it does not. If the above four potential radical forming reactions are eliminated as the source of the crosslinking side reaction, there must be another mechanism that can produce a powerful radical source that is being overlooked.

Over the years, a number of other methods for reducing the level of crosslinking and consequential gel formation in polymers that have been hydrogenated in latex form utilizing the diimide reduction technique have been discovered. For instance, U.S. Pat. No. 5,039,737 reveals a process for treating hydrogenated lattices made utilizing the diimide reduction technique with ozone to reduce the level of gelled (crosslinked) polymer and to reduce the level of residual hydrazine present. U.S. Pat. No. 5,039,737 more specifically discloses a process for treating an emulsion of a crosslinked elastomeric polymer containing residual hydrazine to obtain a latex of soluble (uncrosslinked) elastomeric polymer having a reduced concentration of residual hydrazine therein, said process comprising the addition of ozone to said emulsion in an amount and under conditions which are sufficient for the ozone to react with the crosslinked elastomeric polymer and the residual hydrazine to produce a latex of soluble (essentially uncrosslinked) elastomeric polymer having a reduced level of residual hydrazine therein. However, this ozone treatment process is extremely difficult to implement and control in commercial applications. Additionally, the ozonolysis breaks double bonds in the polymer and results in treated polymer having terminal aldehyde end groups. In any case, it changes the polymer structure and some microgel still typically persists. Thus, this ozone treatment technique is not universally suitable in commercial applications.

U.S. Pat. Nos. 5,424,356, 5,442,007, and 5,442,009 disclose a technique for addressing the shortfalls associated with the ozone treatment process. This technique involves treating the ozonated latex with hydroxylamine in an amount and under conditions which are sufficient to convert the aldehyde end groups of the elastomeric polymer in the latex to oxime end groups. This results in the formation of an oximated polymer latex. Unfortunately, this process changes the structure of the polymer and microgel still continues to persist after treatment. Accordingly, this process is again not commercially viable in most applications.

U.S. Pat. No. 6,521,694 describes using a boron type catalyst in the diimide reduction process. The process described by U.S. Pat. No. 6,521,694 utilizes (1) a reducing agent selected from hydrazines and hydrazine-releasing compounds, (2) an oxidizing compound, and (3) a catalyst, wherein the catalyst contains an element from group 13 of the Periodic Table of the Elements, such as boron. It is preferred for the catalyst to be chosen from the group consisting of borates, peroxiborates and boric acid ($H_3BO_3$). More preferably, the catalyst is boric acid. It is most preferred that boric acid is used in combination with a polyvinyl alcohol. Crosslinking and resulting gel formation are problems that also occur in cases where this type of catalyst system is implemented. Thus, the technique of U.S. Pat. No. 6,521,694 has limited commercial applicability.

U.S. Pat. No. 6,552,132 discloses a process for the hydrogenation of a polymer composed of diene monomer units and nitrile group containing monomer units, in which the hydrogenation in the form of an aqueous dispersion is carried out in the presence of hydrazine and an oxidizing compound, comprising breaking crosslinks formed as a result of the hydrogenation by adding after the hydrogenation a compound that satisfies formula I or by adding before, during or after the hydrogenation a compound that satisfies formula

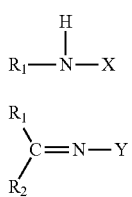

formula I formula II wherein
$R_1$ is a hydrogen atom, an alkyl or cycloalkyl group with 1-30 carbon atoms, or an aromatic group with 6-30 carbon atoms and
$R_2$ is an alkyl or cycloalkyl group with 1-30 carbon atoms, or an aromatic group with 6-30 carbon atoms,
X is selected from the group consisting of —$R_3$, —$OR_4$, —$SR_4$, and —$NR_5R_6$, where
$R_3$, $R_4$, and $R_5$ are a hydrogen atom, an alkyl or cycloalkyl group with 1-30 carbon atoms, or an aromatic group with 6-30 carbon atoms and
$R_6$ is an alkyl or cycloalkyl group with 1-30 carbon atoms, or an aromatic group with 6-30 carbon atoms,
Y is selected from the group consisting of —$R_7$, —$OR_8$, —$SR_8$, —$NR_9R_{10}$, and —N=$CR_{11}R_{12}$, where
$R_7$, $R_8$, $R_9$, $R_{10}$, $R_{11}$, and $R_{12}$ are a hydrogen atom, an alkyl or cycloalkyl group with 1-30 carbon atoms, or an aromatic group with 6-30 carbon atoms,
and wherein $R_3$-$R_{12}$ optionally contain one or more heteroatoms from the groups 13, 14, 15, 16, or 17 from the Periodic System of the Elements, and whereby the process is carrying out without using ozonolysis to break the crosslinks. However, the compounds used in this patent have limited effectiveness.

It has been well established by Lin, Wideman, Parker and many others that copper ion is a superior and highly active catalyst in the emulsion diimide hydrogenation process and that this ion functions within the surfactant membrane separating the aqueous bulk phase from the unsaturated rubber within the particle. What is unclear is the structure and reactivity of the various copper intermediates within the surfactant membrane and how these intermediates change reactivity as a function of the changing concentrations of hydrazine and residual polymer unsaturation.

As is often the case in scientific investigation, discoveries and insights in disparate areas can, at times, crossover to give a new perspective to old problems. Concurrent with the development and commercialization of the diimide latex hydrogenation method in the 1993-2008 timeframe, groundbreaking academic research into understanding how multinuclear copper and iron enzymes function to activate hydrogen peroxide and/or oxygen for various substrate oxidations, were elucidated in some detail. The ability to mimic nature in selectively performing oxidations of organic molecules under mild "green" conditions is a critical goal in chemical research. Metalloenzymes containing metals capable of activating oxygen to form new highly reactive metal-oxygen species have been shown to selectively oxidize even the strongest C—H bond in methane. Numerous reviews on this field of research are available (see C. E. Elwell, N. L. Gagnon, B. D. Neisen, D. Dhar, A. D. Spaeth, G M. Yee, and W B. Tolman, Chem Rev. 2017; 117(3): 2059-2107; Lewis E. and Tolman W., Chem Rev. 2004 February; 104(2):1047-76; Yee G M, Tolman W B. Transition Metal Complexes and the Activation of Dioxygen. In: Kroneck P M H, Sosa Torres M E, Sigel A, Sigel H, Sigel R K O, editors. Sustaining Life on Planet Earth: Metalloenzymes Mastering Dioxygen and Other Chewy Gases. Vol. 15. Springer; Cham, Switzerland: 2015. pp. 131-204. Metal Ions in Life Sciences Series; van der Vlugt J I, Meyer F. Homogeneous Copper-Catalyzed Oxidations. In: Meyer F, Limberg C, editors. Organometallic Oxidation Catalysis. Vol. 22. Springer-Verlag; Berlin: 2007. pp. 191-240. Topics in Organometallic Chemistry Series; Hematian S, Garcia-Bosch I, Karlin K D. Synthetic Heme/ Copper Assemblies: Toward an Understanding of Cytochrome c Oxidase Interactions with Dioxygen and Nitrogen Oxides. Acc Chem Res. 2015; 48:2462-2474; Smirnov V. V., Brinkley D. W., Lanci M. P., Karlin K. D., Roth J. P. Probing Metal-Mediated O2Activation in Chemical and Biological System. J Mol Catal A: Chem. 2006; 251:100-107; and Y. Shimoyama and T. Kojima, Inorg. Chem., 58, 9517 (2019)).

The mechanism behind E. J. Corey's 1961 seminal discovery that metal ions (especially copper) were necessary catalysts for the reaction of hydrogen peroxide with hydrazine to generate diimide remains unclear after reviewing all of these pertinent publications which deal with various aspects of copper-oxygen chemistry. Additionally, little mechanistic information appears to be available on the application of copper-oxygen complexes for the oxidation of substrates under micellar catalytic conditions. The copper catalyzed latex diimide hydrogenation process is a variant of a micellar system wherein the latex particles having an optimal particle size which is within the range of ~30 nm to 60 nm (approximately virus sized particles) are stabilized with a surfactant membrane containing an active copper-oxygen species.

In 1995, the Tolman group discovered that there exists an interesting equilibrium between dicopper (II) peroxo complexes and a dicopper (III) dioxo species. In more polar solvents such as THE, the dioxo form is favored due to better solvation (see W. B. Tolman et. al., J. Am. Chem. Soc. (1995), 117, 8865.23). This is likely to also be the case within the polar surfactant membrane. This equilibrium is shown in the upper left side (species A and B) of the reaction scheme illustrated in FIG. 1.

FIG. 1 illustrates the catalyzed formation of diimide by copper-oxygen complexes using oxygen. In FIG. 1 the originally formed dicopper (II) carboxylate complex generated by the addition of cupric sulfate to the latex stabilized with a potassium fatty acid surfactant, is represented as [$Cu^{+2}Cu^{+2}$] (ligands not shown for clarity). This species is immediately reduced to a dicopper (I) carboxylate species, [$Cu^{+1}Cu^{+1}$]. In the presence of oxygen, the dicopper (I) carboxylate species reacts to yield ($\mu$-$\eta^2$:$\eta^2$-peroxo)dicopper (II), species "A". Species "A" is then in equilibrium with species "B", bis ($\mu$-oxo) dicopper (III). The extent of this equilibrium shift toward species "B" is determined by solvent and ligand effects. Ligands such as amine and/or deprotonated amides are known to stabilize the copper (III) oxidation state. Species "B" can directly oxidize hydrazine to diimide while being reduced to species "C", bis($\mu$-hydroxo)dicopper (II). The further reaction of species "C" with hydrazine yields diimide, water and regenerates dicopper (I) carboxylate to complete the catalytic cycle. The generated diimide continuously reacts with the olefin unsaturation within the polymer to yield nitrogen and the hydrogenated polymer.

As illustrated in FIG. 2 the cases where hydrogen peroxide is used as the hydrazine oxidant, the catalytic situation is somewhat simpler. Here, neither the copper (III) oxidation state nor its stabilization is a factor in diimide formation. The bis(μ-hydroxo)dicopper (II), species C generated by the direct reaction of the dicopper (I) carboxylate species with hydrogen peroxide reacts with hydrazine to yield diimide, water and the regenerated dicopper (I) carboxylate.

However, in both scenarios as depicted in FIG. 1 and FIG. 2, the hydrazine concentration falls towards the end of the hydrogenation process. Several very reactive copper-oxygen species can form and begin to act upon the substrate polymer by hydrogen abstraction. OH radicals from a copper catalyzed Fenton-like process, superoxide and/or copper oxyl radicals can initiate hydrogen abstraction, ultimately resulting in polymer crosslinking.

Again, from the work of Schiessl and Migliaro, it appears as if a large molar excess of hydrazine over the polymer olefin concentration will effectively suppress the hydrogen abstraction mechanism or mechanisms (again see U.S. Pat. No. 5,057,601 (1991). Unfortunately, recovery and reuse of excess hydrazine from an aqueous latex system, although possible, is an expensive and time consuming process. In any case, there is a continuing need for a technique to make hydrogenated lattices of elastomeric polymers utilizing the diimide latex hydrogenation method without causing gel formation or changing the attributes of the polymer, such as by introducing unwanted functionality. Such a process should desirably be safe, environmentally friendly, and economically attractive.

SUMMARY OF THE INVENTION

This invention is based upon the discovery that the level of crosslinking encountered in the diimide reduction of unsaturated polymers in latex form can be greatly reduced by complexing the metal ion activator with a hydroxyl radical inactivating ligand (OIL). For instance, it has been found that non-steroidal anti-inflammatory drugs and other compounds that can complex with the metal ion, such as acetaminophen, can be utilized. Anthranilic acid and its derivatives (fenamates) as well as histidine fulfill the criteria of —OH inactivating ligands when complexed with copper.

This invention accordingly represents a significant improvement on the diimide reduction process for making functionalized hydrogenated rubber with low gel contents. Lattices of hydrogenated, functionalized elastomers having low gel contents made by employing the technique of this invention can also be coagulated to recover dry polymers having desirable targeted performance attributes.

Virtually any type of unsaturated functionalized elastomer latex can be reduced by the process of this invention to make a hydrogenated rubber. Normally the elastomer will contain at least one conjugated diolefin monomer, such as 1,3-butadiene or isoprene, and can optionally contain additional ethylenically unsaturated monomers, such as vinyl aromatic monomers. It will also typically contain repeat units that are derived from at least one monomer which contains a functional group, such as a carboxyl group, a hydroxyl group, an epoxy group, an amide group, an active halide functional group, and the like. For example, the latex can be of a nitrile rubber, a carboxylated nitrile rubber, a carboxylated styrene-butadiene rubber, and the like. The technique of this invention can be employed to reduce polymers of virtually any molecular weight. The molecular weight of the elastomeric polymer will typically be within the range of 500 to 200,000, will more typically be within the range of 1000 to 150,000. The hydrogenated rubbers made in accordance with this invention will typically have a saturation level of greater than about 90% and will normally have a saturation level which is within the range of about 92% to about 99.5%. In many cases the hydrogenated rubber to have a saturation level which is within the range of about 94% to about 99%.

The subject invention more specifically discloses a hydrogenation system which is comprised of (1) an oxidant; (2) a reducing agent selected from the group consisting of hydrazine and hydrazine hydrates; and (3) a metal ion activator which is complexed with hydroxyl radical inactivating ligands.

The present invention also reveals a process for hydrogenating an unsaturated polymer latex which comprises hydrogenating the unsaturated polymer latex in the presence of (1) an oxidant; (2) a reducing agent selected from the group consisting of hydrazine and hydrazine hydrates; and (3) a metal ion activator which is complexed with hydroxyl inactivating ligands.

The subject invention further discloses a hydrogenated nitrile rubber having a number average molecular weight of at least 50,000, a gel content of less than 0.5 percent, and a saturation level which is of greater than 90%.

DETAILED DESCRIPTION OF THE INVENTION

Figure 1:
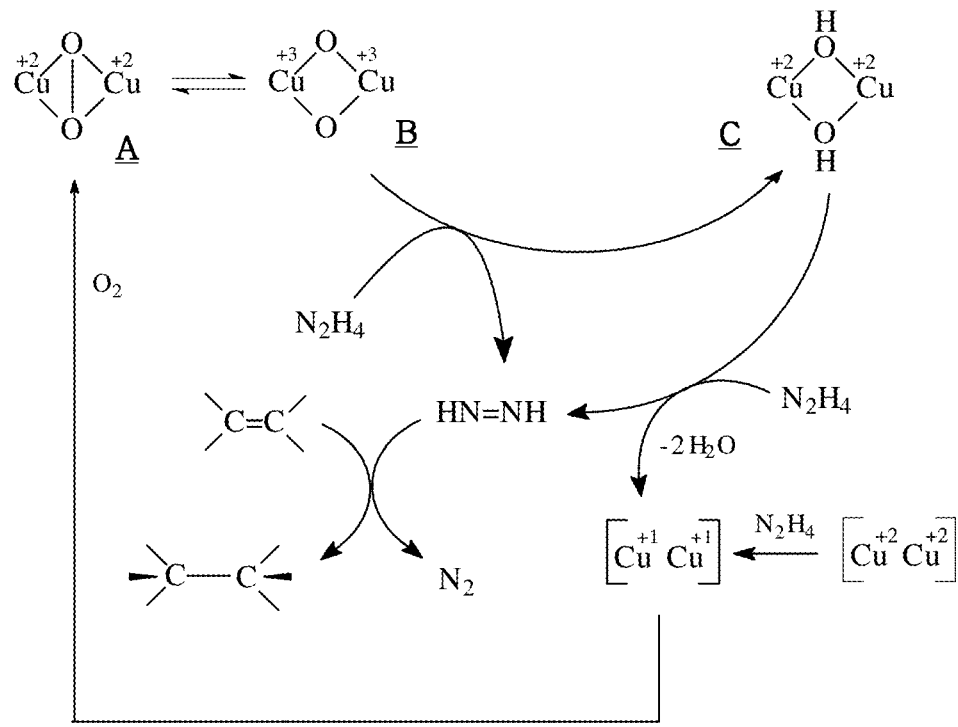
FIG. 1 illustrates a catalyzed formation of diimide by copper-oxygen complexes using oxygen.
Figure 2:
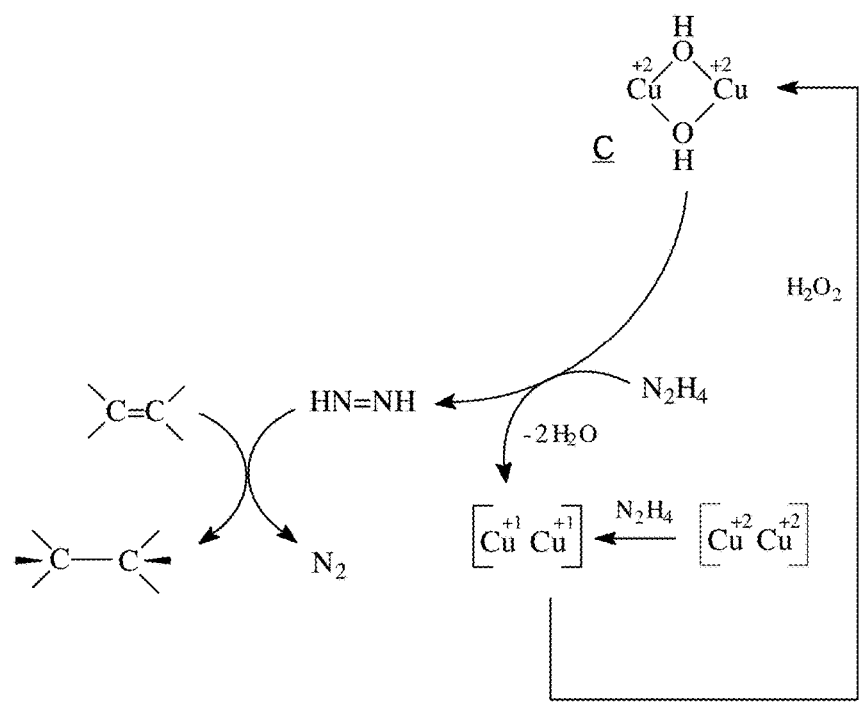
FIG. 2 illustrates a catalyzed formation of diimide by copper-oxygen complexes using hydrogen peroxide.

The diimide reduction process comprises reacting an ethylenically unsaturated polymer in latex form with a reducing agent, a metal catalyst and an oxidant. The diimide reduction process is explained in detail in U.S. Pat. No. 4,452,950, the teachings of which are incorporated herein by reference in their entirety. The reducing agent is typically hydrazine, a hydrate of hydrazine, or a hydrazine-releasing compound. The oxidant is typically oxygen (which can be introduced as air), hydrogen peroxide, or a hydroperoxide, such as cumyl hydroperoxide, t-butyl hydroperoxide, p-menthane hydroperoxide, and the like. A metal ion or salt that will react with hydrazine and reduce to a lower valence state is used in the technique described in U.S. Pat. No. 4,452,950. Such metals include antimony, arsenic, bismuth, cerium, chromium, cobalt, copper, gold, iron, lead, manganese, mercury, molybdenum, nickel, osmium, palladium, platinum, polonium, selenium, silver, tellurium, tin, and vanadium. Iron and copper are preferred with copper being the most preferred. A copper salt, such as copper sulfate ($CuSO_4$) is normally used in commercial applications.

In the practice of this invention the metal ion is complexed with one or more hydroxyl inactivating ligands (OILS). The hydroxyl inactivating ligands can non-steroidal anti-inflammatory drugs. Some representative examples of non-steroidal anti-inflammatory drugs that can be used include acetylsalicylic acid (Aspirin); celecoxib (4-[5-(4-methylphenyl)-3-(trifluoromethyl)pyrazol-1-yl]benzenesulfonamide which is sold under the tradenames Celebrex, Onsenal, Elyxyb and is further identified by CAS Number 169590-42-5); dexdetoprofen ((2S)-2-[3-(benzoyl)phenyl] propanoic acid which is sold under the tradename Kerala and which is further identified by CAS Number 22161-81-5); diclofenac (2-(2,6-dichlorophenylamino)phenylacetic acid which is also known as diclofenac sodium and which is sold under the tradenames Voltaren, Cataflam, Voltaren-XR and is further identified by CAS Number 15307-86-5); diflunisal (2',4'-difluoro-4-hydroxybiphenyl-3-carboxylic acid which is sold under the tradename Dolobid and is further identified by CAS Number 22494-42-4); etodolac ((RS)-2-(1,8-diethyl-4,9-dihydro-3H-pyrano[3,4-b]indol-1-yl)acetic acid which is sold under the tradenames Lodine and Lodine XL and which is further identified by CAS Number 41340-25-4); etoricoxib (5-Chloro-6'-methyl-3-[4-(methylsulfonyl)phenyl]-2,3'-bipyridine which is sold under the tradename Algix and which is further identified by CAS Number 202409-33-4); fenoprofen (2-(3-phenoxyphenyl) propanoic acid which is sold under the tradenames Fenopron and Nalfron and which is further identified by CAS Number 29679-58-1); firocoxib (3-(Cyclopropylmethoxy)-5,5-dimethyl-4-(4-methylsulfonylphenyl)furan-2-one which is sold under the tradenames Equioxx and Previcox and which is further identified by CAS Number 189954-96-9); flurbiprofen ((RS)-2-(2-fluorobiphenyl-4-yl)propanoic acid which is sold under the tradenames Urbifen, Ansaid, Flurwood, and Proben and which is further identified by CAS Number 5104-49-4); ibuprofen ((RS)-2-(4-(2-Methylpropyl)phenyl) propanoic acid which is sold under the tradenames Advil, Brufen, Motrin, Nurofen, Medipren, and Nuprin and which is further identified by CAS Number 15687-27-1); indomethacin (2-{1-[(4-Chlorophenyl)carbonyl]-5-methoxy-2-methyl-1H-indol-3-yl}acetic acid which is sold under the tradenames Indocin, Indocin SR, and Indocin IV and which is further identified by CAS Number 53-86-1); ketoprofen ((RS)-2-(3-benzoylphenyl)propanoic acid which is sold under the tradenames Actron, Orudis, Oruvail, and Ketoflam and which is further identified by CAS Number 22071-15-4); ketorolac ((±)-5-benzoyl-2,3-dihydro-1H-pyrrolizine-1-carboxylic acid which is sold under the tradenames Toradol, Sprix, Toradol IV/IM, and Toradol IM and which is further identified by CAS Number 74103-06-3); licofelone ([6-(4-Chlorophenyl)-2,2-dimethyl-7-phenyl-2,3-dihydro-1H-pyrrolizin-5-yl]acetic acid which is further identified by CAS Number 156897-06-2); lornoxicam ((3E)-6-chloro-3-[hydroxy(pyridin-2-ylamino)methylene]-2-methyl-2,3-dihydro-4H-thieno[2,3-e][1,2]thiazin-4-one 1,1-dioxide which is sold under the tradename Xefo and which is further identified by CAS Number 70374-39-9); loxoprofen ((RS)-2-{4-[(2-oxocyclopentyl)methyl]phenyl}propanoic acid which is sold under the tradenames Loxonin, Loxomac, and Oxeno and which is further identified by CAS Number 68767-14-6); lumiracoxib ({2-[(2-chloro-6-fluorophenyl) amino]-5-methylphenyl}acetic acid which is sold under the tradename Prexige and which is further identified by CAS Number 220991-20-8); meclofenamic acid (2-[(2,6-dichloro-3-methylphenyl)amino]benzoic acid which is sold under the tradename Meclomen and which is further identified by CAS Number 644-62-2); mefenamic acid (2-(2,3-dimethylphenyl)aminobenzoic acid which is sold under the tradename Ponstel and which is further identified by CAS Number 61-68-7); meloxicam (4-Hydroxy-2-methyl-N-(5-methyl-2-thiazolyl)-2H-1,2-benzothiazine-3-carboxamide-1,1-dioxide which is sold under the tradenames Movalis, Mel ox, Recoxa, and Mobic and which is further identified by CAS Number 71125-38-7); nabumetone (4-(6-methoxy-2-naphthyl)-2-butanone which is sold under the tradename Relafen and which is further identified by CAS Number 42924-53-8); naproxen ((+)-(S)-2-(6-Methoxynaphthalen-2-yl)propanoic acid which is sold under the tradenames Aleve, Anaprox, Midol Extended Relief, Naprosyn, and Naprelan and which is further identified by CAS Number 22204-53-1); nimesulide (N-(4-Nitro-2-phenoxyphenyl)methanesulfonamide and is sold under the tradenames Sulide, Nimalox, and Mesulid and is further identified by CAS Number 51803-78-2); oxaprozin (3-(4,5-diphenyl-1,3-oxazol-2-yl) propanoic acid which is sold under the tradenames Daypro, Dayrun, and Duraprox and which is further identified by CAS Number 21256-18-8); parecoxib (N-{[4-(5-methyl-3-phenylisoxazol-4-yl)phenyl]sulfonyl}propanamide which is sold under the tradename Dynastat and which is further identified by CAS Number 198470-84-7); piroxicam (4-Hydroxy-2-methyl-N-(2-pyridinyl)-2H-1,2-benzothiazine-3-carboxamide 1,1-dioxide which is sold under the tradename Feldene and which is further identified by CAS Number 36322-90-4); rofecoxib (4-(4-methylsulfonylphenyl)-3-phenyl-5H-furan-2-one which is sold under the tradenames Vioxx, Ceoxx, and Ceeoxx and which is further identified by CAS Number 162011-90-7); salsalate (2-(2-Hydroxybenzoyl)oxybenzoic acid which is sold under the tradenames Mono-Gesic, Salflex, Disalcid, and Salsitab and which is further identified by CAS Number 552-94-3); sulindac ({(1Z)-5-fluoro-2-methyl-1-[4-(methylsulfinyl)benzylidene]-1H-inden-3-yl}acetic acid which is sold under the tradename Clinoril and which is further identified by CAS Number 38194-50-2); tenoxicam ((3E)-3-[hydroxy (pyridin-2-ylamino)methylene]-2-methyl-2,3-dihydro-4H-thieno[2,3-e][1,2]thiazin-4-one 1,1-dioxide which is sold under the tradename Mobi flex and which is further identified by CAS Number 59804-37-4); tolfenamic acid (2-[(3-chloro-2-methylphenyl)amino]benzoic acid) which is sold under the tradenames Clotam Rapid, and Tufnil and which is further identified by CAS Number 13710-19-5); valdecoxib (4-(5-methyl-3-phenylisoxazol-4-yl)benzenesulfonamide which is sold under the tradename Bextra and which is further identified by CAS Number 181695-72-7); and phenylbutazone (4-Butyl-1,2-diphenyl-pyrazolidine-3,5-dione which is sold under the tradename Butazolidin and which is further identified by CAS Number 50-33-9). Fenamates are non-steroidal anti-inflammatory drug that can be utilized in making complexes with the metal. Some representative examples of fenamates that can be utilized include fenamic acid, mefenamic acid, tolfenamic acid, flufenamic acid, and meclofenamic acid. In one embodiment of this invention the metal can be complexed with acetaminophen. Salicylic acid (SLA), acetylsalicylic acid (ASA), and anthranilic acid (AA), as well as binary and ternary complexes with copper are of particular interest as are capsaicin (8-methyl-N-vanillyl-6-nonenamide) complexes with copper. Histidine mixtures with ASA, SLA, or AA in copper complexes are also of particular interest as cross-linking inhibitors in the practice of this invention.

It is typically desirable for the metal ions to be complexed with at least a stoichiometric level of hydroxyl inactivating ligands. However, some level of benefit can typically be attained even in cases where there is a molar deficiency of hydroxyl inactivating ligands. In most cases, the molar ratio of the metal ions to hydroxyl inactivating ligands will be at least 2:3. More typically, the molar ratio of the metal ions to hydroxyl inactivating ligands will be at least 1:2. It is normally preferred for there to be a molar excess of hydroxyl inactivating ligands to metal ions. Copper usually forms a 1:2 complex with hydroxyl inactivating ligands and the molar ratio of the copper ion to hydroxyl inactivating ligands will generally be within the range of 1:2 to 1:30. In the case of fenamates that contain carboxyl functionality a higher level of molar excess over the molar level of metal ions is typically preferred. In any case, the molar ratio of the copper ions to hydroxyl inactivating ligands can within the range of 1:5 to 1:25 or more typically the molar ratio of the copper ions to hydroxyl inactivating ligands within the range of 1:10 to 1:20.

The unsaturated polymers that can be hydrogenated in latex form in accordance with the method of this invention are typically comprised of repeat units that are derived from 1 weight percent to 100 weight percent of a conjugated diene monomer, 99 weight percent to 0 weight percent of an ethylenically unsaturated monomer, and 1 weight percent to 20 weight percent of one or more reactive functional group-containing monomers. Specific examples of the conjugated diene monomer are 1,3-butadiene, isoprene, chloroprene, alkyl substituted conjugated dienes, such as 2,3-dimethyl butadiene and 1,3-pentadiene. Some representative examples of some specific ethylenically unsaturated monomer include acrylonitrile, methacrylonitrile, styrene, $\alpha$-alkyl styrenes, acrylic and methacrylic esters having an alkyl group containing from 1 to 20 carbon atoms, such as methyl methacrylate, butyl acrylate, and methoxyethyl acrylate. 2-ethylhexyl acrylate, octyl methacrylate, and the like.

As has been described, the diimide reduction process can selectively hydrogenate double bonds without reducing nitro, cyano, carboxyl and other functional groups, which allows it to incorporate polymerized-in functional group into polymer chain for making practically useful functionalized liquid hydrogenated polymers. The reactive functionalized polymer is able to form crosslinking in the hydrogenated polymer itself under desired condition or formation of chemical and physical bonds between the hydrogenated polymer and substrates, which has useful applications in the areas of coatings, adhesives, matrix of composites, polymer additives, and other applications. Examples of functional monomers that can be used in accordance with the present invention are carboxyl, hydroxyl, epoxy, amide and active halide containing monomers. The carboxyl monomer is an aliphatic or aromatic acid which contains 1 to 20 carbon atoms. The monomer can be a mono-carboxylic acid or a poly-carboxylic acid. Specific examples of such carboxylic acids include acrylic acid, methacrylic acid, ethacrylic acid, crotonic acid, 2-pentanoic acid, maleic acid, fumaric acid, mesaconic acid, itaconic acid, 3-buttene-1,2,3-tricarboxylic acid, vinylbenzoic acid, and the like. Specific examples of hydroxyl group containing monomers include hydroxyethyl methacrylate, hydroxybutyl methacrylate, hydroxybutyl acrylate, 2-hydroxypropyl acrylate, and N-methylolacrylamide. Examples of epoxy group containing monomers include glycidyl acrylate, glycidyl methacrylate, and allyl glycidyl ether. Examples of amide and active halide group containing monomer include acrylamide, methacrylamide, vinylbenzyl chloride, vinyl chloroacetate, chloroethyl vinyl ether, and the like.

The unsaturated polymer may be prepared by any polymer synthesis method, such as emulsion polymerization, solution polymerization, suspension polymerization, non-aqueous dispersion polymerization, vapor phase polymerization, and bulk polymerization. Polymer prepared from solution, non-aqueous, vapor phase, or bulk polymerization needs to be converted to latex form by any known process so that they can subsequently be hydrogenated by the diimide reduction process. It is accordingly preferred for the polymer to be synthesized by aqueous emulsion polymerization so that the resulting polymer latex can be directly used in the diimide reduction process.

Conventional cold or hot emulsion recipes may be employed to prepare the unsaturated polymer in latex form. Ionic surfactants, of known common types, including fatty acid, sulfonate, sulfate, and phosphate surfactants are useful in the present invention. The level of ionic surfactant is computed based upon the total weight of monomers charged and ranges from 1 to 20 parts by weight of ionic surfactant per 100 parts by weight of monomer (phm) with 1-15 phm being more preferred and 2-10 phm being most preferred. A known initiator for free radical polymerization is employed. For example, persulfate systems and azonitrile systems are conventionally used in hot emulsion recipes. Examples of persulfate system are sodium persulfate, ammonium persulfate, and examples of azonitrile are 2,2'-azobis(2-methyl-propanenitrile), 2,2'-azobis(2,4-dimethylpropanenitrile), 2,2'-azobis(2-methylbutanenitrile), and the like. Free radical initiators used in cold emulsion recipes include organic hydroperoxides. Representative of organic hydroperoxides are cumene hydroperoxide, paramenthane hydroperoxide, diisopropylbenzene hydroperoxide, pinene hydroperoxide, and tertiary butyl hydroperoxide. In cold polymerization, activator is used to produce free radicals efficiently at temperature lower than 25° C. Examples of activator system are a combination of chelated iron salts and formaldehyde sulfoxylate, or dimethylamine. Free radical produced by initiator and activator is called redox reaction. The activator recipes are often varied so that the polymerization is controlled in a desired rate. It may be advisable to polymerize at such an initiator level that, at reaching the desired conversion, the initiator is nearly consumed. This may, for instance, be effectuated by choosing a low ratio of the initiator level to the activator level.

The temperature of the emulsion polymerization may range from 1° C. to 99° C. If a hot polymerization recipe is used, the temperature of the polymerization generally ranges from about 40° C. to about 90° C. Preferably, the temperature of the hot polymerization ranges from about 25° C. to about 80° C. with a range from about 50° C. to about 70° C. being particularly preferred. The temperature of the cold polymerization generally ranges from about 0° C. to 25° C. Preferably, the temperature of the cold polymerization ranges from about 5° C. to 20° C. with a range of from about 5° C. to 10° C. being particularly preferred. The polymerization is generally carried out to monomer conversion ranging from about 70 to 100 percent.

Unsaturated polymers of virtually any molecular weight can be reduced in accordance with the method of this invention. Such polymers will typically have a molecular weight which is within the range of about 500 to about 1,000,000. For instance, polymers having very low molecular weights can be reduced using the technique of this invention. In fact, the method of this invention can even be used to reduce liquid polymers In any case such low molecular weight polymers typically have number average molecular weights which are within the range of 500 to 20,000 and generally have number molecular weight ranges from about 1000 to 10,000. In some embodiments of this invention the low molecular weight polymer will have a number average molecular weight ranges from 3,000 to 8,000. In synthesizing such low molecular weight polymers a chain transfer agent is normally applied in the polymerization recipe to obtain the needed low molecular weight polymer. Specific examples of chain transfer agent include sulfur-containing compounds, such as tertiary dodecyl mercaptan, triisobutyl mercaptan, n-dodecyl mercaptan, and diisopropyl xanthogen disulfide. The level of chain transfer agent is calculated based upon the total weight of monomers charged and ranges from 1 to 20 parts by weight of chain transfer agent per 100 parts by weight of monomer (phm) with 3-15 phm being more preferred and 5-10 phm being most preferred. The solids content of the polymer latex used in the diimide hydrogenation can range from 1 to 70% by weight, and is preferably within the range of 30% to 50% by weight.

On the other hand, unsaturated polymers having much higher number average molecular weights can also be reduced employing the technique of this invention. For instance, such polymers can have number average molecular weights which are within the range of 30,000 to about 1,000,000 and which are typically within the range of 50,000 to 500,000. As has previously been noted such polymer can also be functionalized. For instance, the polymer can be a rubbery polymer which is functionalized with nitrile groups, carbonyl groups, carboxyl groups, amino groups, halogen groups, and sulfide groups. Accordingly, the rubbery polymer can be a nitrile rubber, a carboxylated nitrile rubber, or a carboxylated styrene-butadiene rubber As has previously been explained, the diimide reduction is conducted using a reducing agent, a metal ion which is complexed with an oil and an oxidant. It is preferably carried out in an open vessel by first adding the reducing agent into the unsaturated polymer latex and subsequently proportioning the oxidant into latex in a way that the desired diimide hydrogenation rate is achieved. The reaction temperature is typically within the range of 0° C. to 200° C., preferably 20° C. to 80° C. Pressure vessels are not required and atmosphere pressure is preferred.

The reducing agent includes hydrazine, hydrazine hydrate, hydrazine acetate, hydrazine sulfate, and any hydrazine-containing compound. Preferably hydrazine hydrate is used in the diimide hydrogenation reaction. The level of hydrazine hydrate is calculated based upon the total moles of unsaturated carbon-carbon double bond in the polymer and it ranges from 50 to 250 moles of hydrazine hydrate per 100 moles of carbon-carbon double bond with 80 to 150 moles per 100 moles of double bond being more preferred. The oxidant is typically utilized at a molar ratio of 0.1:1 to 3:1 relative to hydrazine compound.

The degree of hydrogenation is the percentage of carbon-carbon double bonds that is saturated after the hydrogenation reaction compared to the initial amount of carbon-carbon double bonds. The process in the present invention provides hydrogenated polymers that have degree of hydrogenation from 40% to 100%, preferably the degree of hydrogenation is higher than 70%, more preferably the degree of hydrogenation is higher than 90%.

In one embodiment of this invention the reduction is further carried out in the presence of a dialkyl hydroxylamine, a diaryl hydroxylamine, or an alkyl, aryl-hydroxylamine compound in accordance with the teachings of U.S. Pat. No. 7,767,752 B2. The teachings of U.S. Pat. No. 7,767,752 B2 are incorporated herein by reference for the purpose of describing the use of such compounds in reduction procedures as well as the oxidants, reducing agents, and metal ion activators, such copper ions, that can be used in the practice of this invention. In any case such dialkyl hydroxylamine, a diaryl hydroxylamine, or an alkyl, aryl-hydroxylamine compound are of the structure:

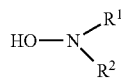

wherein $R^1$ and $R^2$ can be alkyl or cycloalkyl groups containing from 1 to 30 carbon atoms, or aromatic groups containing from 6 to 40 carbon atoms. $R^1$ can be the same or different from $R^2$. In the case of alkyl, aryl-hydroxylamines $R^1$ represents an alkyl group and $R^2$ represents an aryl group. The term "alkyl group" as used herein is an organic moiety that contains only carbon and hydrogen atoms which are arranged in a straight or branched chain. Alkyl groups are of the general formula $-C_nH_{2n+1}$ wherein n is an integer that represents the number of carbon atoms in the alkyl group. Some representative examples of alkyl groups include methyl groups, ethyl groups, normal-propyl groups, iso-propyl groups, normal-butyl groups, iso-butyl groups, and tertiary-butyl groups. The term "aryl group" as used herein is an organic moiety that is derived from an aromatic compound such as benzene, naphthalene, anthracene, or phenanthrene. Phenyl groups are representative examples or aryl groups that can be used. The aryl group can be substituted with an alkyl group or a functional group ($-NO_2$). Specific examples of the above compound are N,N-dimethyl hydroxylamine, N,N-diethyl hydroxylamine, N,N-dibutyl hydroxylamine, N-methyl, N-phenyl-hydroxyl amine, N,N-(1,8-Naphthalyl)hydroxylamine, N,N-Bis-benzotriazol-1-ylmethyl-hydroxylamine, N-Tert-butyl-N-(3,5-dinitro-phenyl)-hydroxylamine and the like. Some additional examples of dialkyl-hydroxylamines and diaryl hydroxyl amines that can be used include bis(octadecyl)hydroxylamine, N,N-Dipentadecyl-hydroxylamine, and N-Tert-butyl-N-(3,5-dinitro-phenyl)-hydroxylamine.

It is believed that free radicals produced by the oxidants used in the diimide reduction process are one of the primary sources responsible for crosslinking during the hydrogenation process. The dialkyl hydroxylamines and diaryl hydroxylamines used in the method of this invention are believed to act as radical scavengers which can eliminate several free radicals by one molecule on either its one N-alkyl side or its two N-alkyl side. The mechanism of radical scavenging by a dialkyl hydroxylamine is shown below.

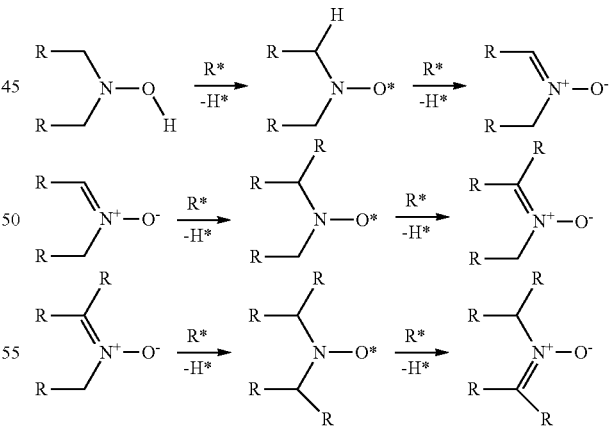

Addition of dialkyl hydroxylamine or diaryl hydroxylamine efficiently inhibits the cross-linking reaction in the diimide reduction process. The amount of hydroxylamine compound used in the present invention is computed based upon the total moles of double bond in the polymer latex and ranges from 1 to 30 moles of dialkyl hydroxylamine or diaryl hydroxylamine per 100 moles of double bond with 5-15 moles being more preferred. The dialkyl hydroxylamine or diaryl hydroxylamine is added into the polymer latex before or during the diimide reduction process. It is also useful in reducing the gel content of the hydrogenated polymer to add the dialkyl hydroxylamine or diaryl hydroxylamine compound right after completing the hydrogenation process. Preferably, it is added into the polymer latex before starting the diimide reduction.

The residual hydrazine in the latex after the diimide hydrogenation can be eliminated by adding ozone to the hydrogenated latex, which can be accomplished by bubbling ozone through the latex while rapidly agitating the hydrogenated polymer latex. The ozone treatment will be carried out for a time which is sufficient to reduce the quantity of undesirable residual hydrazine to the desired low level. Specifically the level of residual hydrazine after ozonolysis should normally be within the range of 0 ppm to 200 ppm, and preferably 0 ppm to 100 ppm. The teachings of U.S. Pat. No. 5,039,737 for reducing the level of residual hydrazine with ozone are incorporated herein by reference. However, it should be noted that the latex will typically be void of ozone during the diimide reduction and at the time that the latex is treated with the dialkyl hydroxylamine or the diaryl hydroxylamine. A different process that can be used to eliminate residual hydrazine is to add additional hydrogen peroxide. The molar ratio of additional hydrogen peroxide to hydrazine used for such a purpose will typically be within the range of 0.1:1 to 1:1 and will preferably be within the range of 0.3:1 to 0.5:1.

In one embodiment of this invention, residual anthranilic acid remaining after the reduction (hydrogenation) could be polymerized under basic conditions with hydrogen peroxide into poly-anthranilic acid or a copolymer of anthranilic acid and aniline according to the following reactions:

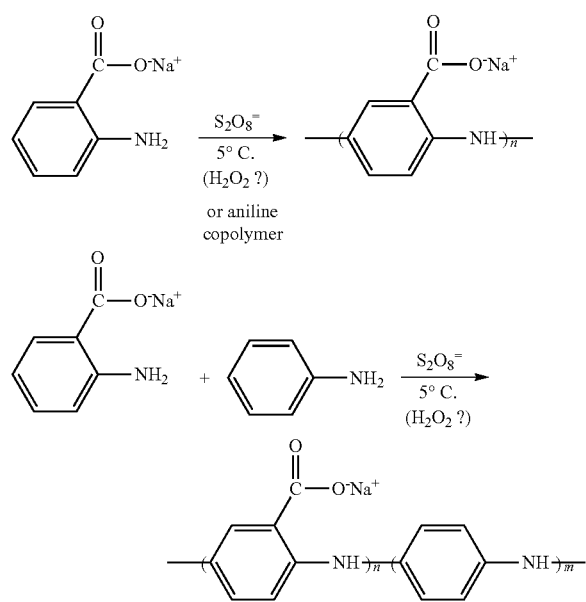

(see N Toshima et. al., Bull. Chem. Soc. Jpn., 69, 2395 (1996).)

This invention is illustrated by the following examples that are merely for the purpose of illustration and are not to be regarded as limiting the scope of the invention or the manner in which it can be practiced. Unless specifically indicated otherwise, parts and percentages are given by weight.

Examples 1-4

A low viscosity nitrile rubber latex was prepared for use in this series of experiments using elevated levels of t-dodecylmercaptan (≈~1.2 phr), potassium stearate (3.5 phr), trisodium phosphate (0.2 phr), and potassium persulfate (0.3 phr) as the initiator at a temperature of 21° C. Polymerization was run to complete conversion to produce an NBR latex with the following properties after vacuum stripping:

Low Viscosity NBR Latex Properties

| | |
|---|---|
| Total Solids (%) | 39.7 |
| Solids (%), corrected for surfactant | 37.3 |
| pH | 11.3 |
| Brookfield Viscosity (cps) | 22.5 |
| Surface Tension (dynes/cm) | 54 |
| Mechanical Stability (grams/100 grams of latex) | 0.85 |
| Bound Acrylonitrile (%) | 39.0 |
| Particle Size: Volume Average (nm) | 75 |
| Dilute Solution Viscosity (cps, CHCl$_3$) | 0.422 |

In the reduction procedure employed, a 1 liter 3-neck flask which was equipped with a mechanical paddle stirrer, a hydrogen peroxide inlet tube and a condenser with a gas outlet vent attached to a bubbler was charged with 191.6 grams of the NBR latex containing 50.8 grams of rubber (0.547 moles of olefin). The flask was immersed in a constant temperature water bath which was maintained at 55° C. Various catalyst compositions as described in Table 1 were then added to the stirred latex followed by the addition of 37.5 grams of a 64% hydrazine solution (0.750 moles) which is equivalent to 1.3 moles per mole of olefin. A 47% solution of hydrogen peroxide was then added to the mixture at a rate of 0.35 grams per minute with a peristaltic pump. The peroxide addition was continued until an ORP reading of ~0.0 mV was obtained using an oxidation/reduction electrode.

It should be noted that the mole ratio of hydrogen peroxide to hydrazine required to reach the desired ORP electrode reading of ~0.0 mV was ~1.3 in each of the experimental runs. After allowing the hydrogenated latex to stand at room temperature for approximately 48 hours, a latex film was case on a Teflon® polytetrafluoroethylene coated pan and allowed to dry overnight before being peeled from the pan and dried in a circulation air oven for 90 minutes at a temperature of 65°. Four specimens (150-200 mg±0.1 mg) were than cut from the dried film and swollen in chloroform for 12 hours. The swollen film samples were then carefully removed from the chloroform, quickly blotted dry on a paper towel and reweighed in a stoppered tared bottle. The specimens were then dried once again for 90 minutes at a temperature of 65° C. before being reweighed.

Q-values were again determined according to the formula:

$Q$=(swollen weight−dried weight/initial weight with the Q-values being a semiquantitative indicator of relative crosslink density and with higher Q-values being indicative of lower levels of crosslinking.

TABLE 1

Relationship of Q-Values to Catalyst Preparation and Copper Concentration

| Example | [Cu]/[Olefin] | Catalyst System | Q-Value*** | Olefin Saturation [e] |
|---|---|---|---|---|
| 1 | 1.2 × 10$^{-5}$ | Cu/Surfactant *[a] | 13.4 | 94.6% |
| 2 | 2.5 × 10$^{-5}$ | Cu/AA **[b] | 18.1 | 94.7% |

TABLE 1-continued

Relationship of Q-Values to Catalyst Preparation and Copper Concentration

| Example | [Cu]/[Olefin] | Catalyst System | Q-Value*** | Olefin Saturation $^e$ |
|---|---|---|---|---|
| 3 | $1.2 \times 10^{-5}$ | Cu/AA **c | 20.5 | 94.0% |
| 4 | $1.2 \times 10^{-5}$ | Cu/AA **d | 23.6 | 94.2% |

\* sodium dodecylphenylether disulfonate
\*\* anthranilic acid
\*\*\*Average of 4 measurements
$^a$ 0.302 grams of 1% CuSO4 solution, 0.35 grams of sodium dodecylphenylether disulfonate
$^b$ 1.2 grams (8.75 mmol) AA, 1.4 grams (25 mmol) KOH in 10 ml of water + 7.3 mg (2.17 x $10^{-5}$ moles of cupric anthranilate
$^c$ 1.38 grams (10 mmol) AA, 1.35 grams (24 mmol) KOH in 10 ml of water followed by 0.306 grams of 1% CuSO$_4$ solution
$^d$ 4 mg (1.2 x $10^{-5}$ moles) of cupric anthranilate
$^e$ determined by FTIR Using the OIL (—OH radical inactivating ligand) hypothesis as a guide, the four diimide hydrogenations of HNBR latex were performed in Examples 1-4 under identical conditions except for the copper catalyst variations shown in Table 1. The percent hydrogenation in each case was essentially the same (within the range of 94.0% to 94.7%). However, from the data shown in Table 1, distinct differences were observed in relative crosslinking behavior as measured by swelling of cast films in chloroform (Q-values). A Q-value of 13.4 was obtained in Example 1 which was carried out as a control using the copper catalyst (aqueous cupric sulfate) and some additional sodium sulfonate surfactant as a stabilizer. In contrast, Examples 3 and 4 which had identical copper concentrations to the control (Example 1) but which were stabilized with anthranilate ligands showed a dramatic decrease in relative crosslink density (Q-values of 20.5 and 23.6, respectively). Example 2 was also stabilized with anthranilate ligands and had twice the copper concentration as was used in the other experimental runs. At this higher level of copper concentration, it still demonstrated a Q-value of 18.1 which was higher than the control (Example 1), but which was inferior to the Q-values realized in Examples 3 and 4 which were stabilized using lower copper levels.

While certain representative embodiments and details have been shown for the purpose of illustrating the subject invention, it will be apparent to those skilled in this art that various changes and modifications can be made therein without departing from the scope of the subject invention.

What is claimed is:

1. A process for hydrogenating an unsaturated polymer latex which comprises hydrogenating the unsaturated polymer latex in the presence of (1) an oxidant; (2) a reducing agent selected from the group consisting of hydrazine and hydrazine hydrates; and (3) a metal ion activator which is complexed with hydroxyl inactivating ligands.

2. The process for hydrogenating an unsaturated polymer latex as specified in claim 1 wherein the functionalized unsaturated rubber latex is functionalized with a functional group selected from the group consisting of nitrile groups, carbonyl groups, carboxyl groups, amino groups, halogen groups, and sulfide groups.

3. The process for hydrogenating an unsaturated polymer latex as specified in claim 1 wherein the oxidant is selected from the group consisting of oxygen and hydroperoxides.

4. The process for hydrogenating an unsaturated polymer latex as specified in claim 3 wherein the metal ion activator is comprised of a metal selected from the group consisting of antimony, bismuth, cerium, chromium, cobalt, copper, gold, iron, lead, manganese, mercury, molybdenum, nickel, osmium, palladium, platinum, silver, and tin.

5. The process for hydrogenating an unsaturated polymer latex as specified in claim 4 wherein the metal is complexed with a non-steroidal anti-inflammatory drug.

6. The process for hydrogenating an unsaturated polymer latex as specified in claim 4 wherein the non-steroidal anti-inflammatory drug is selected from the group consisting of acetylsalicylic acid, 4-[5-(4-methylphenyl)-3-(trifluoromethyl) pyrazol-1-yl], ((2S)-2-[3-(benzoyl)phenyl]propanoic, 2-(2,6-dichlorophenylamino)phenylacetic, 2',4'-difluoro-4-hydroxybiphenyl-3-carboxylic acid, (RS)-2-(1,8-Diethyl-4,9-dihydro-3H-pyrano[3,4-b]indol-1-yl) acetic acid, 5-chloro-6'-methyl-3-[4-(methylsulfonyl)phenyl]-2,3'-bipyridine, 2-(3-phenoxyphenyl) propanoic acid, 3-(cyclopropylmethoxy)-5,5-dimethyl-4-(4-methylsulfonylphenyl) furan-2-one, (RS)-2-(2-fluorobiphenyl-4-yl) propanoic acid, (RS)-2-(4-(2-Methylpropyl)phenyl) propanoic acid, 2-{1-[(4-chlorophenyl) carbonyl]-5-methoxy-2-methyl-1H-indol-3-yl}acetic acid, (RS)-2-(3-benzoylphenyl) propanoic acid, (+)-5-benzoyl-2,3-dihydro-1H-pyrrolizine-1-carboxylic acid, ([6-(4-Chlorophenyl)-2,2-dimethyl-7-phenyl-2,3-dihydro-1H-pyrrolizin-5-yl]acetic acid, (3E)-6-chloro-3-[hydroxy (pyridin-2-ylamino)methylene]-2-methyl-2,3-dihydro-4H-thieno[2,3-e][1,2]thiazin-4-one 1,1-dioxide, (RS)-2-{4-[(2-oxocyclopentyl)methyl]phenyl}propanoic acid, {2-[(2-chloro-6-fluorophenyl)amino]-5-methylphenyl}acetic acid, 2-[(2,6-dichloro-3-methylphenyl)amino]benzoic acid, 2-(2,3-dimethylphenyl)aminobenzoic acid, 4-Hydroxy-2-methyl-N-(5-methyl-2-thiazolyl)-2H-1,2-benzothiazine-3-carboxamide-1,1-dioxide, 4-(6-methoxy-2-naphthyl)-2-butanone, (+)-(S)-2-(6-Methoxynaphthalen-2-yl) propanoic acid, N-(4-Nitro-2-phenoxyphenyl) methanesulfonamide, 3-(4,5-diphenyl-1,3-oxazol-2-yl) propanoic acid, N-{[4-(5-methyl-3-phenylisoxazol-4-yl)phenyl]sulfonyl}propanamide, 4-Hydroxy-2-methyl-N-(2-pyridinyl)-2H-1,2-benzothiazine-3-carboxamide 1,1-dioxide, 4-(4-methylsulfonylphenyl)-3-phenyl-5H-furan-2-one, 2-(2-hydroxybenzoyl)oxybenzoic acid, {(1Z)-5-fluoro-2-methyl-1-[4-(methylsulfinyl)benzylidene]-1H-indene-3-yl}acetic acid, (3E)-3-[hydroxy (pyridin-2-ylamino)methylene]-2-methyl-2,3-dihydro-4H-thieno[2,3-e][1,2]thiazin-4-one 1,1-dioxide, 2-[(3-chloro-2-methylphenyl)amino]benzoic acid), 4-(5-methyl-3-phenylisoxazol-4-yl)benzenesulfonamide, 8-methyl-N-vanillyl-6-nonenamide, and 4-butyl-1,2-diphenyl-pyrazolidine-3,5-dione.

7. The process for hydrogenating an unsaturated polymer latex as specified in claim 4 wherein the metal ion activator is comprised of copper.

8. The process for hydrogenating an unsaturated polymer latex as specified in claim 7 wherein the concentration of the unsaturated polymer in the latex is within the range of 1 weight percent to 70 weight percent.

9. The process for hydrogenating an unsaturated polymer latex as specified in claim 1 wherein the hydrogenation is carried out at a temperature which is within the range of 20° C. to 150° C.

10. The process for hydrogenating an unsaturated polymer latex as specified in claim 9 wherein the oxidant is hydrogen peroxide.

11. The process for hydrogenating an unsaturated polymer latex as specified in claim 6 wherein the molar ratio of the metal ion activator to hydroxyl inactivating ligands is within the range of 1:2 to 1:30.

12. The process for hydrogenating an unsaturated polymer latex as specified in claim 3 wherein the metal ion activator is complexed with a fenamate.

13. The process for hydrogenating an unsaturated polymer latex as specified in claim 12 wherein the fenamate is selected from the group consisting of fenamic acid, mefenamic acid, tolfenamic acid, flufenamic acid, and meclofenamic acid.

14. The process for hydrogenating an unsaturated polymer latex as specified in claim 3 wherein the metal ion activator is complexed with an acetaminophen.

15. The process for hydrogenating an unsaturated polymer latex as specified in claim 7 wherein the copper is complexed with anthranilic acid.

16. The process for hydrogenating an unsaturated polymer latex as specified in claim 5 wherein the metal is copper.

17. The process for hydrogenating an unsaturated polymer latex as specified in claim 6 wherein the metal ion activator comprises copper ions and wherein the molar ratio of the copper ions to hydroxyl inactivating ligands within the range of 1:10 to 1:20.

* * * * *